(12) United States Patent
Shintani (10) Patent No.: US 10,061,257 B2
(45) Date of Patent: Aug. 28, 2018

(54) IMAGE FORMING APPARATUS (71) Applicant: KYOCERA Document Solutions Inc., Osaka (JP)

(72) Inventor: Yoshihisa Shintani, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/647,606

(22) Filed: Jul. 12, 2017

(65) Prior Publication Data
US 2018/0032020 A1    Feb. 1, 2018

(30) Foreign Application Priority Data

Jul. 28, 2016  (JP) .................................. 2016-148961

(51) Int. Cl.
*G03G 15/00* (2006.01)
*B41J 11/00* (2006.01)
*G06F 3/12* (2006.01)
*H04N 1/44* (2006.01)

(52) U.S. Cl.
CPC ............ *G03G 15/70* (2013.01); *B41J 11/006* (2013.01); *G06F 3/1271* (2013.01); *H04N 1/4413* (2013.01); *G03G 2221/1675* (2013.01); *H04N 2201/0094* (2013.01)

(58) Field of Classification Search
CPC ................................................. G03G 15/70
USPC ....................................................... 358/1.14
See application file for complete search history.

(56) References Cited

U.S. PATENT DOCUMENTS

| 6,470,413 B1* | 10/2002 | Ogawa .................. G06F 12/023 348/231.7 |
| 8,136,049 B2 | 3/2012 | Kunita et al. |
| 8,976,390 B2* | 3/2015 | Yasukawa .......... H04N 1/00408 358/1.1 |
| 2008/0079659 A1 | 4/2008 | Kunita et al. |
| 2015/0212468 A1* | 7/2015 | Adachi .............. G03G 15/5091 399/80 |

FOREIGN PATENT DOCUMENTS

| JP | 2005-334454 A | 12/2005 |
| JP | 2008-092368 A | 4/2008 |

* cited by examiner

*Primary Examiner* — Jacky X Zheng
(74) *Attorney, Agent, or Firm* — IP Business Solutions, LLC (57) ABSTRACT

An image forming apparatus includes a display unit, an operation unit, a memory, and a control unit. The operation unit is operable by a user. The memory stores log information. The control unit includes a processor and, based on operation of the processor in accordance with an operation control program, allows, at an occurrence of an error, the display unit to display an error code corresponding to the error, and upon acceptance of input of a maintenance mode activation password inputted by operating the operation unit, activates a maintenance mode. Under an activation state of the maintenance mode, the control unit reads out the log information from the memory and saves the log information onto a predetermined recording medium, and allows the display unit to display a maintenance screen after the saving of the log information.

2 Claims, 10 Drawing Sheets

| KIND OF ERROR | ERROR CODE | DEGREE OF ERROR | ADDRESS FOR THE OPERATION PROCEDURE |
|---|---|---|---|
| aaa | △△△△△ | NONCRITICAL ERROR | ...... |
| ...... | ...... | NONCRITICAL ERROR | ...... |
| ddd | ××××× | NONCRITICAL ERROR | ...... |
| ...... | ...... | CRITICAL SECOND ERROR | ...... |
| fff | ●●●●● | CRITICAL SECOND ERROR | ...... |
| ...... | ...... | CRITICAL FIRST ERROR | |
|  |  | CRITICAL FIRST ERROR | |

IMAGE FORMING APPARATUS

INCORPORATION BY REFERENCE

This application claims priority to Japanese Patent Application No. 2016-148961 filed on Jul. 28, 2016, the entire disclosure of which are incorporated herein by reference.

BACKGROUND

The present disclosure relates to image forming apparatuses that execute a maintenance mode at an occurrence of an error and particularly relates to a technique of displaying a maintenance screen.

Some image forming apparatuses display, at an occurrence of an error, an operation procedure for eliminating the error on a display unit. A user sees the displayed operation procedure and conducts the operation for eliminating the error. When a critical error has occurred, an error code for example is displayed on the display unit instead of the operation procedure. A service person is called in such cases. The service person inputs a password to display a maintenance screen on the display unit, sees the maintenance screen, and operates the procedure for eliminating the error.

Also in some image forming apparatuses, an error message is displayed in a superimposed manner on a screen of a normal operation, so that the screen of the normal operation right before the occurrence of the error can be viewed.

Furthermore, some image forming apparatuses are capable of arbitrarily setting a presence and absence, a display time, a color, and so on of a display of the message, in accordance with kinds of the message.

SUMMARY

A technique improved over the aforementioned techniques is proposed herein as an aspect of the present disclosure.

An image forming apparatus according to an aspect of the present disclosure includes a display unit, an operation unit, a memory, and a control unit. The operation unit is operable by a user. The memory stores log information. The control unit includes a processor, and based on operation of the processor in accordance with an operation control program, allows the display unit, at an occurrence of an error, to display an error code corresponding to the error, and upon acceptance of input of a maintenance mode activation password inputted by operating the operation unit, activates a maintenance mode. Furthermore, under an activation state of the maintenance mode, the control unit reads out the log information from the memory and saves the log information onto a predetermined recording medium, and allows the display unit to display a maintenance screen after the saving of the log information.

DETAILED DESCRIPTION

Hereinafter, a description will be given for one embodiment of the present disclosure with reference to the drawings.

Figure 1:
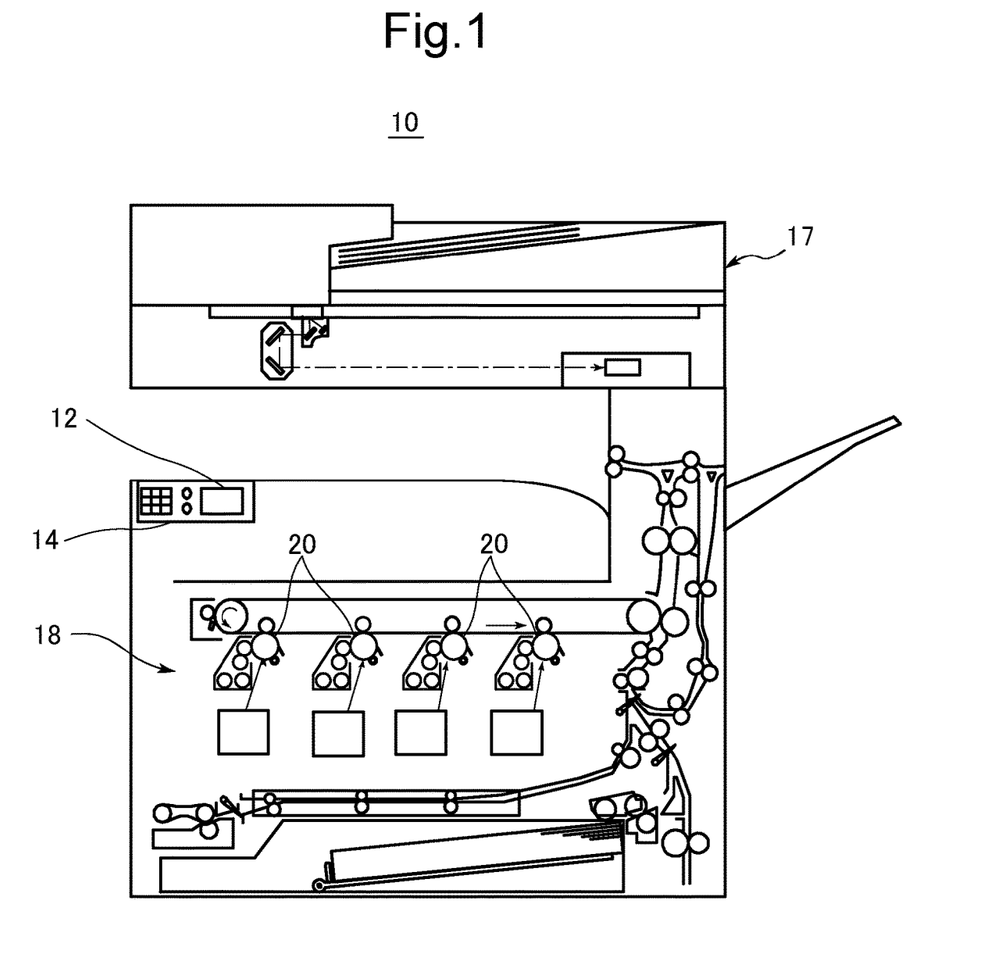
FIG. 1 is a sectional view showing an image forming apparatus according to one embodiment of the present disclosure.
Figure 2:
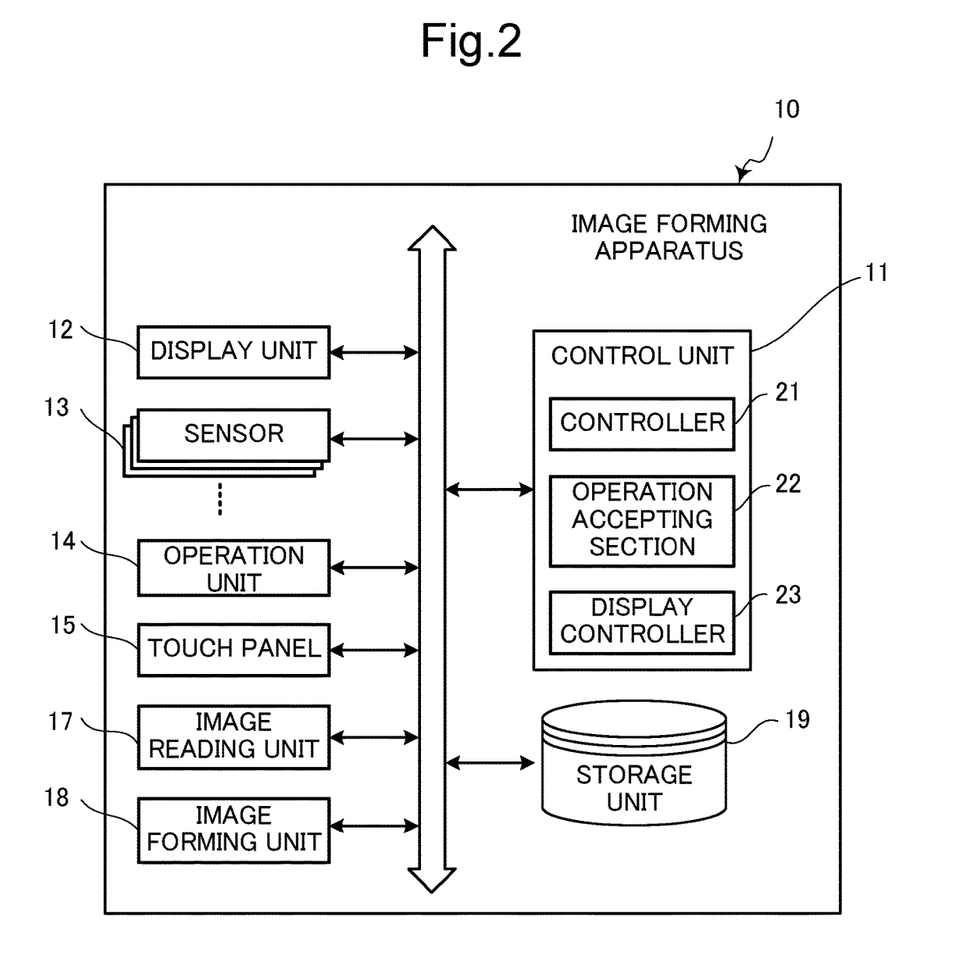
FIG. 2 is a block diagram showing a configuration of the image forming apparatus according to the embodiment.

FIG. 1 is a sectional view showing an image forming apparatus according to the embodiment of the present disclosure. FIG. 2 is a block diagram showing a configuration of the image forming apparatus according to the one embodiment.

The image forming apparatus 10 according to the one embodiment is a multifunction peripheral (MFP) having a plurality of functions, such as copying, printing, scanning, and facsimile transmission. The image forming apparatus 10 includes units such as a control unit 11, a display unit 12, a plurality of sensors 13, an operation unit 14, a touch panel 15, an image reading unit 17, an image forming unit 18, and a storage unit 19. These components are capable of mutually transmitting and receiving data and signals through a bus.

The image reading unit 17 includes a scanner that optically reads a document, and generates an image data indicating the image of the document to thereby store the document image on the storage unit 19.

The image forming unit 18 evenly charges each surface of photosensitive drums 20 and exposes the surfaces of the photosensitive drums 20 to form an electrostatic latent image thereon. The electrostatic latent image on the surfaces of the photosensitive drums 20 is developed into an toner image and the toner image (image) formed on the surfaces of the photosensitive drums 20 is transferred onto a recording paper sheet through an intermediate transfer belt, then the toner image is fixed on the recording paper sheet then the sheet is discharged. The image forming unit 18, for example, prints an image indicated by the image data formed on the image reading unit 17 onto a recording paper sheet.

The display unit 12 is formed of a liquid crystal display (LCD) or an organic light-emitting diode (OLED) display.

The display unit 12 includes a touch panel 15 on the screen thereof. The touch panel 15, which may be of a resistive film type or an electrostatic capacitance type, serves as the operation unit on which a user's operation performed on the screen of the display unit 12 is inputted.

The operation unit 14 is constituted of hard keys including, for example, numeric keys and a start key.

The storage unit 19 is a large-capacity storage device such as an HDD (Hard Disk Drive).

When a job at the image forming apparatus 10 is interrupted, the plurality of sensors 13 detects various causes for the interruption. For example, each of the sensors 13 detects a paper jam, a place of the paper jam, paper exhaustion, toner exhaustion, an error at the image forming unit 18 and so on as the causes for the interruption for the job using the copying function and the printing function.

The control unit 11 includes a processor, a RAM (random access memory), and a ROM (read only memory). The processor is, for example, a CPU (central processing unit), an MPU (micro processing unit), or an ASIC (application specific integrated circuit). The control unit 11 acts as a controller 21, an operation accepting section 22, and a display controller 23 when the processor executes a program stored in the ROM or the storage unit 19. Here, each of the controller 21, the operation accepting section 22, and the display controller 23 of the control unit 11 may be constituted in the form of a hardware circuit, instead of being performed according to the program.

The controller 21 serves to control the overall operation of the image forming apparatus 10.

The operation accepting section 22 has a function of accepting, based on a signal outputted from the touch panel 15, the user's operation performed on the touch panel 15. Additionally, the operation accepting section 22 has a function of accepting the user's operation performed on the hard key, such as the numeric key and the start key, of the operation unit 14.

The display controller 23 controls the display unit 12 and allows the display unit 12 to display, for example, an input screen for setting items that are necessary for image forming processing, an information input screen, and an operation procedure of the image forming apparatus 10.

During operation of the image forming apparatus 10, the controller 21 of the image forming apparatus 10 in this embodiment generates log information with respect to the operation of the image forming apparatus 10, and stores the log information on a RAM (volatile memory) of the control unit 11. The log information is used, for example, to grasp an error occurrence condition.

Also, the controller 21 determines, based on detection output of each of the sensors 13, the error that has occurred at the image forming apparatus 10 during operation of the image forming apparatus 10. Based on the detection output of each of the sensors 13, when the controller 21 determines an occurrence of a noncritical error, the controller 21 allows the display unit 12 to display, through the display controller 23, an operation procedure for eliminating the noncritical error. The user sees the operation procedure and operates the procedure for eliminating the noncritical error.

In addition, based on the detection output of each of the sensors 13, when the controller 21 determines an occurrence of a critical error, the controller 21 allows the display unit 12 to display, through the display controller 23, an error code corresponding to the critical error, instead of the operation procedure. A service person must be called in this situation. The service person operates the operation unit 14, inputs the password to activate the maintenance mode, and then performs an operation for the maintenance to eliminate the critical error.

In general image forming apparatuses, when operation under a maintenance mode is performed by a service person, there are occasions in which log information stored in the RAM of the control unit is initialized and the log information stored in the RAM is deleted due to elimination of the error.

In contrast, in the image forming apparatus 10 according to the embodiment of the present disclosure, when there is a possibility that the log information may be lost, the controller 21 reads out the log information from the RAM, and after saving the log information onto the storage unit 19 or onto an external USB memory, allows the display unit 12 to display, through the display controller 23, the maintenance screen, so that operation based on the maintenance screen can be performed. Such the configuration prevents the log information from being lost and avoids a situation where an error occurrence condition cannot be analyzed based on the log information.

Figure 3:
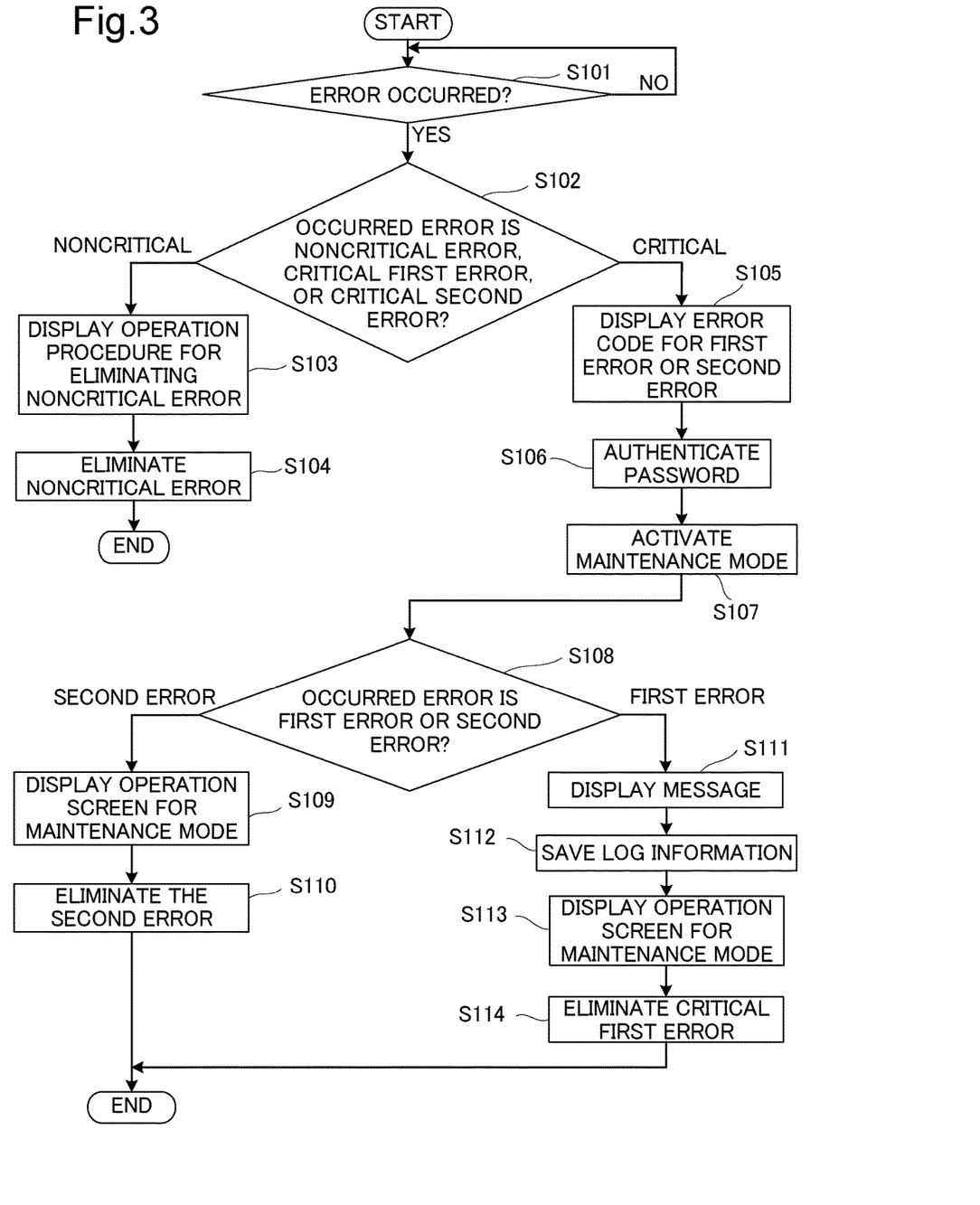
FIG. 3 is a flowchart showing a processing procedure of the image forming apparatus according to the embodiment.

Hereinafter, a processing procedure from the occurrence of the error up to the display of the screen to be referred to for eliminating the error will be described with reference to a flowchart illustrated in FIG. 3.

First of all, during operation of the image forming apparatus 10, the controller 21 determines, based on the detection output of each of the sensors 13, whether an error has occurred or not (step S101). In determining that the error has occurred (YES in step S101), the controller 21 identifies the kind of the occurred error and determines which of the noncritical error, a critical first error, and a critical second error the error that has occurred is (step S102).

Figure 4:
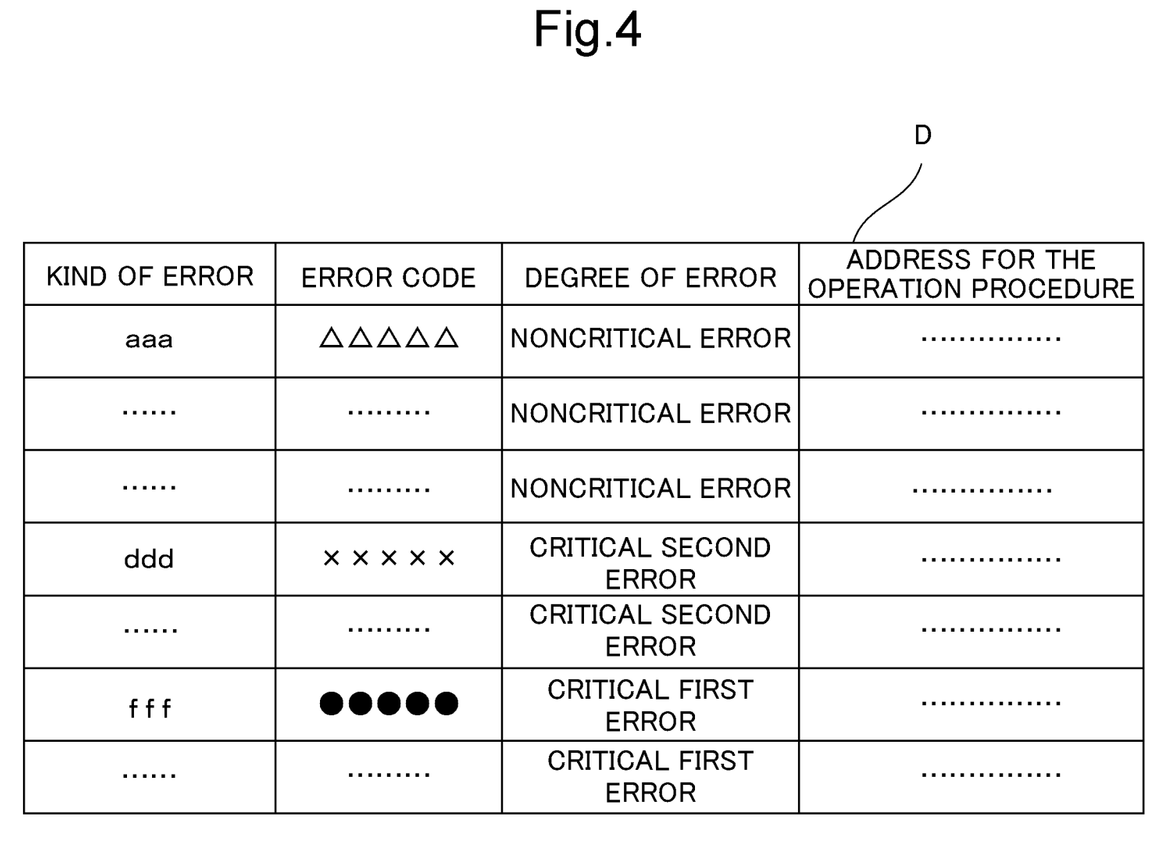
FIG. 4 is a view showing a data table that is used for the processing procedure illustrated in FIG. 3.

For example, based on a data table D illustrated in FIG. 4, it is determined which of the noncritical error, the critical first error, and the critical second error is the occurred error. The data table D stores, for every kind of error, the following items in association with each other: the error code indicating the error; the degree of the error (i.e., noncritical error, critical first error, or critical second error); and the address for the operation procedure for eliminating the respective error. The noncritical error is the error that can be eliminated by the user's operation. The critical first error is the error that is eliminated by the operation performed by the service person under the maintenance mode, and is the error in which the log information stored in the RAM of the control unit 11 might be initialized or deleted due to the operation for eliminating the critical first error. The critical second error is the error that is eliminated by the operation under the maintenance mode, and is the error in which there are no possibilities for the log information to be initialized or deleted due to the operation for eliminating the critical second error. The address for the operation procedure is the address in the storage unit 19 in which the operation procedure is stored. The operation procedure can be read out from the storage unit 19 according to the address.

As thus far described, by referring to the data table D, the controller 21 determines which of the noncritical error, the critical first error, and the critical second error is the error that has occurred. At the same time, by referring to the data table D, the controller 21 extracts the error code corresponding to the occurred error and obtains an address for the operation procedure for eliminating the occurred error and reads out the operation procedure from the storage unit 19.

Figure 5:
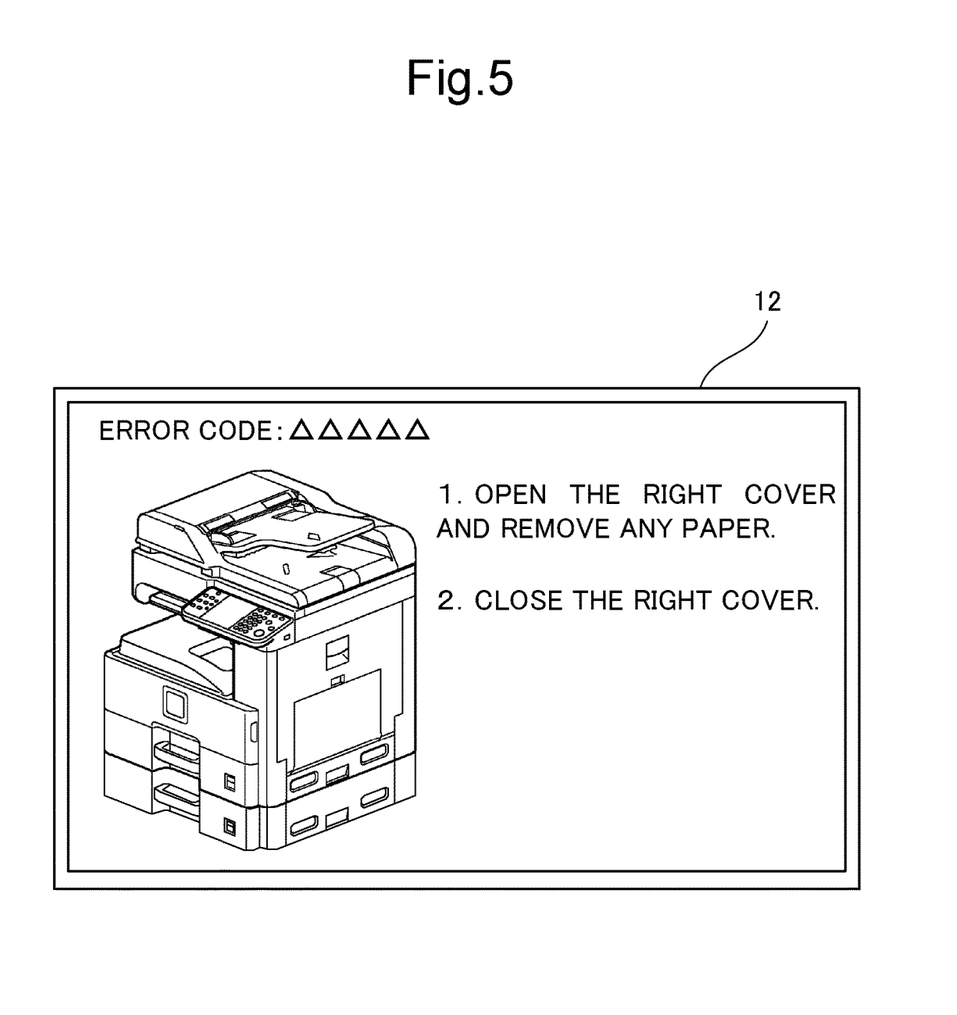
FIG. 5 is a view showing a display unit of the image forming apparatus on which an error code and an operation procedure are displayed.

When, for example, in determining that the occurred error is the noncritical error ("NONCRITICAL" in step S102), the controller 21, through the display controller 23, allows the display unit 12 to display the error code corresponding to the occurred noncritical error and the operation procedure for eliminating the error (step S103) illustrated in FIG. 5. In this case, the user sees the operation procedure and operates the procedure for eliminating the error (step S104).

Figure 6:
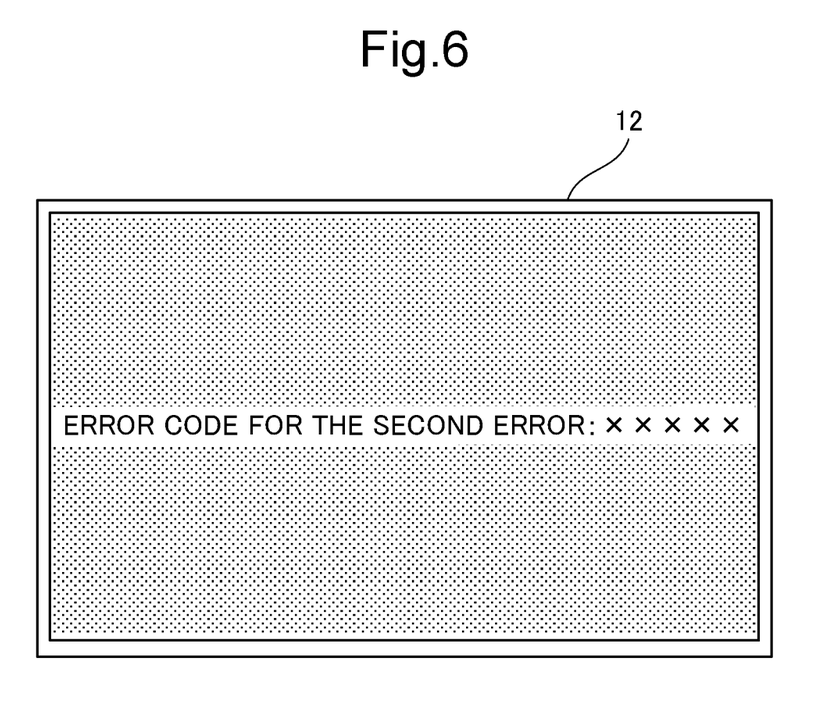
FIG. 6 is a view showing the display unit of the image forming apparatus on which an error code for a second error is displayed.
Figure 7:
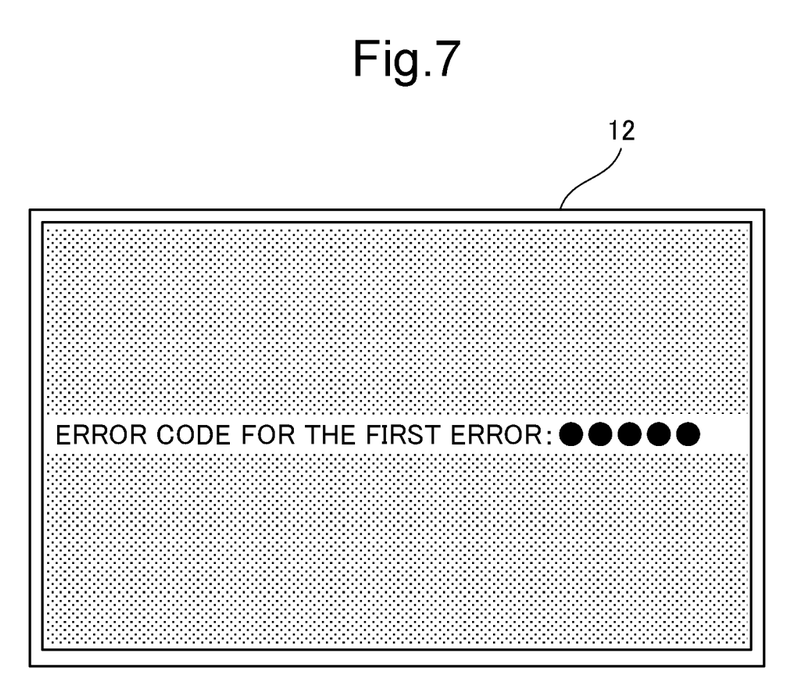
FIG. 7 is a view showing the display unit of the image forming apparatus on which an error code for a first error is displayed.

Additionally, in determining that the occurred error is the critical first error or the critical second error ("CRITICAL" in step S102), the controller 21, through the display controller 23, allows the display unit 12 to display the error code corresponding to the occurred second error, as illustrated in FIG. 6, or to display the error code corresponding to the occurred first error, as illustrated in FIG. 7 (step S105). The operation procedure for eliminating the error as illustrated in FIG. 5, however, is not to be displayed at the display unit 12. The user can judge that it is necessary to call the service person in seeing the display illustrated in FIG. 6 and FIG. 7.

After the service person is called, the service person sees the display illustrated in FIG. 6 and FIG. 7, and determines that it is necessary to activate the maintenance mode. The service person then operates the operation unit 14 to input the preset password for activating the maintenance mode. When the password is accepted at the operation accepting section 22, the controller 21 compares the password with the password having been stored in the storage unit 19 for authentication (step S106), and activates the maintenance mode (step S107).

Figure 8:
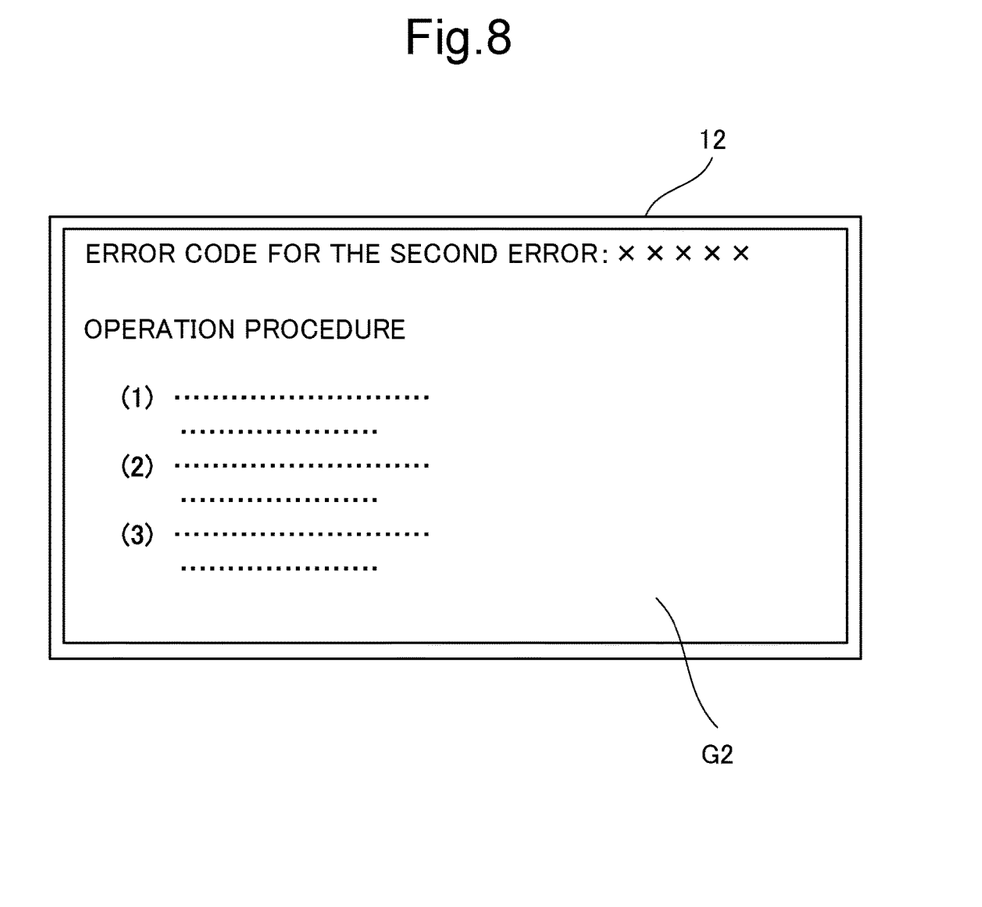
FIG. 8 is a view showing the display unit of the image forming apparatus on which a maintenance screen for the second error is displayed.

Subsequently, the controller 21 determines which of the critical first error and the second error the occurred error is (step S108). In determining that the occurred error is the critical second error ("SECOND ERROR" in step S108), the controller 21 allows, through the display controller 23, the display unit 12 to display a maintenance screen G2 (step S109) illustrated in FIG. 8. The maintenance screen G2 illustrated in FIG. 8 displays, for example, the error code corresponding to the second error and the operation procedure for eliminating the second error. The service person sees the maintenance screen G2 and operates the procedure for eliminating the second error (step S110). As described above, the second error is the error in which there are no possibilities for the log information stored in the RAM of the control unit 11 to be initialized or deleted due to the operation for eliminating the second error, so that loss of the log information will never happen.

Figure 9:
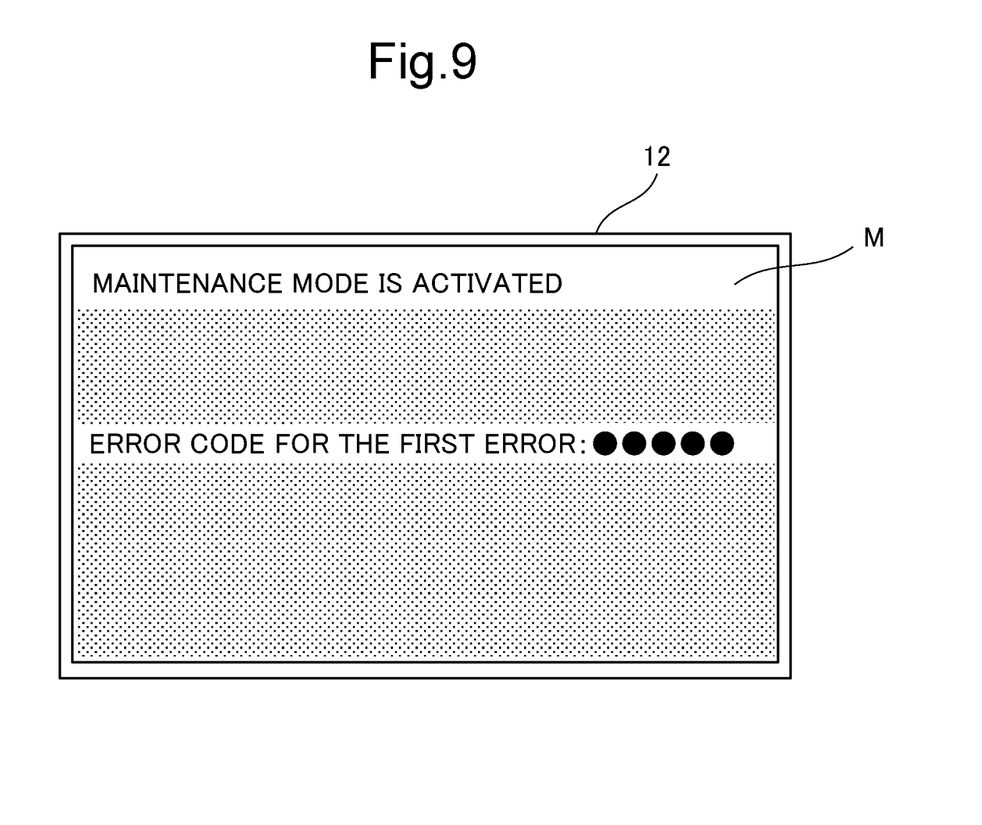
FIG. 9 is a view showing the display unit of the image forming apparatus on which the error code for the first error and a message are displayed.

Furthermore, in determining that the occurred error is the critical first error ("FIRST ERROR" in step S108), the controller 21 allows, through the display controller 23, the display unit 12 to display the error code corresponding to the first error, and the message M indicating that the maintenance mode is under the activation state (step S111) illustrated in FIG. 9. Thus, in a case where the occurred error is the critical first error, even when the password inputted by operating the operation unit 14 is authenticated and the maintenance mode is activated, the maintenance screen is not displayed at the display unit 12 immediately. As illustrated in FIG. 9, the display unit 12 only displays the error code for the first error, and the message M indicating that the maintenance mode is under the activation state.

In this case, the service person can recognize that the occurred error is the critical first error by seeing the display illustrated in FIG. 9. The service person can also recognize that the maintenance mode is under the activation state. The critical first error described above is the error in which the log information stored in the RAM of the control unit 11 might be initialized or deleted due to the operation for eliminating the critical first error. Therefore, the service person operates the operation unit 14 to instruct the saving of the log information store in the RAM of the control unit 11. When the instruction is accepted at the operation accepting section 22, the controller 21 reads out the log information from the RAM of the control unit 11, and saves the log information onto predetermined recording medium such as the storage unit 19 or the external USB memory (step S112). The controller 21 may be designed to save the log information onto the predetermined recording medium when the display unit 12 is allowed to display the error code corresponding to the first error, and the message M indicating that the maintenance mode is under the activation state, without waiting for the saving instruction.

Figure 10:
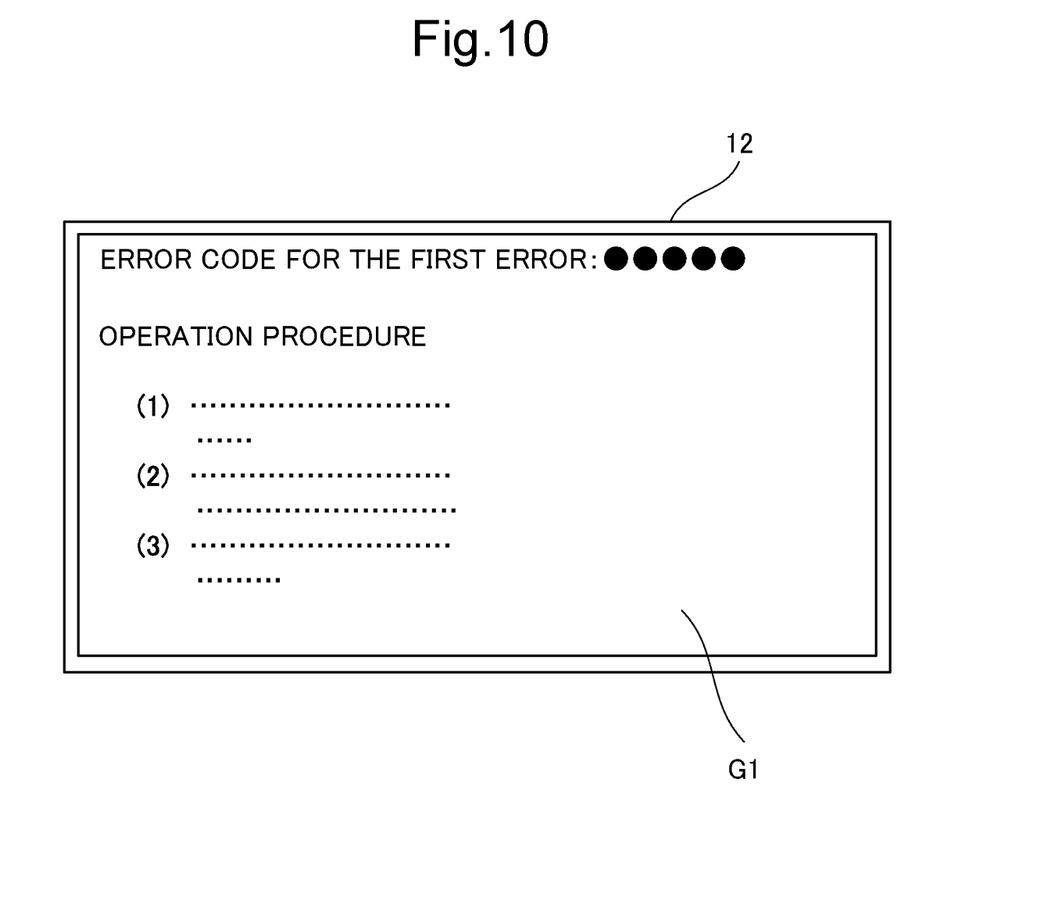
FIG. 10 is a view showing the display unit of the image forming apparatus on which a maintenance screen for the first error is displayed.

After saving the log information, the controller 21 allows, through the display controller 23, the display unit 12 to display a maintenance screen G1 (step S113) illustrated in FIG. 10. The maintenance screen G1 illustrated in FIG. 10 displays, for example, the operation procedure for eliminating the first error. The service person sees the maintenance screen and operates the operation for eliminating the critical first error (step S114).

In contrast, during operation of general image forming apparatuses, log information with respect to operation of the image forming apparatuses is stored on a memory. The log information is used, for example, to grasp an error occurrence condition.

However, in some cases of general image forming apparatuses, as described above, when a critical error has occurred and an operation for the maintenance is performed by a service person, log information is deleted from a memory. For example, in some cases, when operation for the maintenance is performed, a memory storing log information is initialized, and in other cases, the log information stored in the memory is deleted due to the elimination of an error. As a result, elimination of the error itself was difficult, and an error became impossible to be analyzed based on the log information.

The aforementioned general image forming apparatuses do not refer to any techniques of preventing log information from being lost due to the above described maintenance operation.

In contrast, when the critical first error is occurred in this embodiment, the controller 21 allows the display unit 12 to display the error code corresponding to the first error, and the message M indicating that the maintenance mode is under the activation state, and then the service person operates the operation unit 14 to input the password and to instruct the saving of the log information at the same time, the log information is read out from the RAM. The read out log information is stored in the storage unit 19 or the external USB memory to be saved. Subsequently, the controller 21 allows the display unit 12 to display the maintenance screen G2, enabling the operation based on the maintenance screen G2 to be operated. Accordingly, the loss of the log information is prevented and the error occurrence condition can be surely analyzed based on the log information.

In this embodiment, when the password inputted by operating the operation unit 14 is authenticated, the maintenance mode is activated. Therefore, the maintenance operation can be performed by operating the operation unit 14, even when the maintenance screen G1 is not shown on the display unit 12. However, by not displaying the maintenance screen G1, it is capable of notifying the service person of the risk of losing the log information due to the maintenance operation. In this manner, the service person is urged to save the log information; thereby the loss of the log information can be prevented.

In addition, even in a case where the occurrence of the critical first error or the critical second error damages the display unit 12 itself, when the password inputted by operating the operation unit 14 is authenticated, the maintenance mode is activated, and the maintenance operation can be performed by operating the operation unit 14.

This embodiment follows the procedure of: inputting of the password by operating the operation unit 14; activating of the maintenance mode; displaying the error code corresponding to the first error, and the message M; instructing for saving the log information by operating the operation unit 14; saving the log information; and displaying the maintenance screen G1. However, when the password is inputted by operating the operation unit 14, the controller 21 may follow a procedure of: activating the maintenance mode along with reading out the log information from the RAM and performing the saving; and subsequently, allowing the display unit 12 to display the maintenance screen G1.

Further, the configurations and processes of the embodiment described with reference to FIGS. 1 to 10 are merely exemplary, and not intended to limit the scope of the disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
   a display unit;
   an operation unit operable by a user;
   a memory that stores log information; and
   a control unit that includes a processor, and based on operation of the processor in accordance with an operation control program, allows the display unit, at an occurrence of an error, to display an error code corresponding to the error, and upon acceptance of input of a maintenance mode activation password inputted by operating the operation unit, activates a maintenance mode,
   wherein under an activation state of the maintenance mode, the control unit reads out the log information from the memory and saves the log information onto a predetermined recording medium, and allows the display unit to display a maintenance screen after the saving of the log information,
   furthermore, the control unit preliminarily stores an error code for a first error that requires the saving of the log information from the memory, and an error code for a second error that does not require the saving of the log information from the memory,
   in a case of allowing the display unit to display the error code for the first error at an occurrence of the first error, under the activation state of the maintenance mode, the control unit reads out the log information from the memory and saves the log information, and allows the display unit to display the maintenance screen after the saving of the log information, and
   in a case of allowing the display unit to display the error code for the second error at an occurrence of the second error, under the activation state of the maintenance mode, the control unit allows the display unit to display the maintenance screen without reading out the log information from the memory and saving the log information.

2. The image forming apparatus according to claim 1, wherein in the case where the control unit has allowed the display unit to display the error code for the first error, the control unit allows the display unit to display a message indicating that the maintenance mode is under the activation state, along with the error code for the first error.

* * * * *